US010423578B2

(12) United States Patent
Chen

(10) Patent No.: US 10,423,578 B2
(45) Date of Patent: Sep. 24, 2019

(54) MANAGEMENT OF CONTEXTUAL INFORMATION FOR DATA

(71) Applicant: Red Hat, Inc., Raleigh, NC (US)

(72) Inventor: Huamin Chen, Westborough, MA (US)

(73) Assignee: RED HAT, INC., Raleigh, NC (US)

( * ) Notice: Subject to any disclaimer, the term of this patent is extended or adjusted under 35 U.S.C. 154(b) by 548 days.

(21) Appl. No.: 14/721,592

(22) Filed: May 26, 2015

(65) Prior Publication Data
US 2016/0350295 A1  Dec. 1, 2016

(51) Int. Cl.
G06F 16/16        (2019.01)
(52) U.S. Cl.
CPC .................. G06F 16/164 (2019.01)
(58) Field of Classification Search
CPC .......... G06F 17/3012; G06F 17/30321; G06F 16/164
USPC ............ 707/E17.01, E17.005, E17.044, 600,
707/999.1, E17.009, E17.014, E17.089,
707/736, 737, 769, E17.108, 692, 722,
707/740, 999.001, 999.002, 999.003,
707/999.01, 999.205, E17.001, E17.002,
707/E17.007, E17.008, E17.017, E17.032,
707/E17.055, E17.058, E17.109, 607,
707/612, 636, 638, 661, 664, 679, 687,
707/694, 705, 706, 709, 710, 748, 756,
707/770, 792, 802, 803, 812, 823, 825,
707/828, 999.101, 999.102, 999.103,
707/999.2, 999.202; 709/204, 219, 224,
709/205, 214, 221, 226, 230;
711/E12.001, 103, E12.002, E12.008,
711/E12.017, E12.061, 100, 112, 118,
711/154, 206
See application file for complete search history.

(56) References Cited

U.S. PATENT DOCUMENTS 6,108,700 A *  8/2000  Maccabee ........... H04L 41/0631
                                                  709/224
6,434,558 B1    8/2002  MacLeod et al.
6,904,454 B2    6/2005  Stickler
7,246,104 B2    7/2007  Stickler
(Continued)

FOREIGN PATENT DOCUMENTS

WO    WO 2009083732 A1 *  7/2009  ......... G06F 9/44563

OTHER PUBLICATIONS

Mikami et al., Using the Gfarm File System as a POSIX Compatible Storage Platform for Hadoop MapReduce Applications. 2011, GRID '11 Proceedings of the 2011 IEEE/ACM 12th International Conference on Grid Computing, http://dl.acm.org/citation.cfm?id= 2082106.

Primary Examiner — Jay A Morrison
Assistant Examiner — Ken Hoang
(74) Attorney, Agent, or Firm — Haynes and Boone LLP

(57) ABSTRACT

A method, performed by a computing system, includes detecting a data call from an application running on the system, the data call being to access data through a Portable Operating System Interface (POSIX) Application Programming Interface (API), the data being stored on a storage system associated with the computing system. The method further includes, in response to detecting the data call, obtaining, through use of a context extraction module, contextual information associated with the data call. The method further includes accessing the data according to the data call and storing the contextual information.

19 Claims, 4 Drawing Sheets

(56) References Cited

U.S. PATENT DOCUMENTS

| | | |
|---|---|---|
| 8,266,145 B2 | 9/2012 | Leung et al. |
| 8,813,022 B2 | 8/2014 | Rallapalli et al. |
| 9,606,937 B1 * | 3/2017 | Marathe ................ G06F 12/122 |
| 2004/0123242 A1 * | 6/2004 | McKibben ........ G06F 17/30067 715/201 |
| 2004/0230763 A1 * | 11/2004 | Cohen ................ G06F 11/3466 711/170 |
| 2006/0248038 A1 * | 11/2006 | Kaplan ............... G06F 17/3012 |
| 2011/0010514 A1 * | 1/2011 | Benhase ................ G06F 3/061 711/162 |
| 2014/0222994 A1 | 8/2014 | Castro et al. |

\* cited by examiner

| Call ID | File ID | Op. | Process | Args. | Call Stack | Time/Date | User ID |
|---------|---------|-------|-----------|-------|------------|-----------|---------|
| ID 1 | File A | Open | Process 1 | Arg 1 | CS 1 | T/D 1 | ID 1 |
| ID 2 | File A | Write | Process 1 | Arg 2 | CS 2 | T/D 2 | ID 2 |
| ID 3 | File A | Read | Process 2 | Arg 3 | CS 3 | T/D 3 | ID 3 |
| ID 4 | File A | Close | Process 1 | Arg 4 | CS 4 | T/D 4 | ID 4 |
| ID 5 | File B | Seek | Process 3 | Arg 5 | CS 5 | T/D 5 | ID 5 |

*FIG. 3*

MANAGEMENT OF CONTEXTUAL INFORMATION FOR DATA

BACKGROUND

The present disclosure relates generally to computer storage systems, and more particularly to methods and systems for managing contextual information for data stored on such storage systems.

Computer systems regularly store data in the form of files on storage systems associated with such computer systems. Various applications that run on the computing system often access such files. The applications may perform a variety of access operations such as opening a file, reading from a file, writing to a file, and closing a file. Generally, for security purposes, applications themselves are not able to access a file directly. Instead, applications use standard libraries or Application Programming Interfaces (APIs) that use well defined functions to access certain files. An API may use a system call to invoke the services of the kernel. The kernel controls which applications have access to which data. The kernel then accesses the file on behalf of the application.

To help maintain compatibility between computing systems, various standards may be used. One such standard is the Portable Operating System Interface (POSIX). POSIX is a family of standards that define APIs for use by an operating system. It is desirable to be able to obtain useful information about the data stored on a POSIX compliant storage system.

SUMMARY

According to one example, a method, performed by a computing system, includes detecting a data call from an application running on the system, the data call being to access data through a Portable Operating System Interface (POSIX) Application Programming Interface (API), the data being stored on a storage system associated with the computing system. The method further includes, in response to detecting the data call, obtaining, through use of a context extraction module, contextual information associated with the data call. The method further includes accessing the data according to the data call and storing the contextual information.

According to one example, a system includes a processor and a memory comprising machine readable instructions that when executed by the processor, cause the system to execute an application and detect a data call from the application, the data call requesting access to data through a Portable Operating System Interface (POSIX) Application Programming Interface (API), the data being stored on a storage system associated with the system. The system is further to, in response to detecting the data call, determine, through use of a context extraction module, contextual information associated with the data call and store the contextual information.

According to one example, a method, performed by a computing system, includes executing an application and with the application, using a data call to a Portable Operating System Interface (POSIX) Application Programming Interface (API), the data call requesting access to a file stored on a storage system associated with the computing system. The method further includes, with a context extraction module, determining contextual information associated with the call, and through use of a library, causing the kernel to access the file according to the data call. The method further includes storing the contextual information on the storage system.

BRIEF DESCRIPTION OF THE DRAWINGS

FIG. 3 is a diagram showing an illustrative database of contextual information, according to one example of principles described herein.

Figure 1:
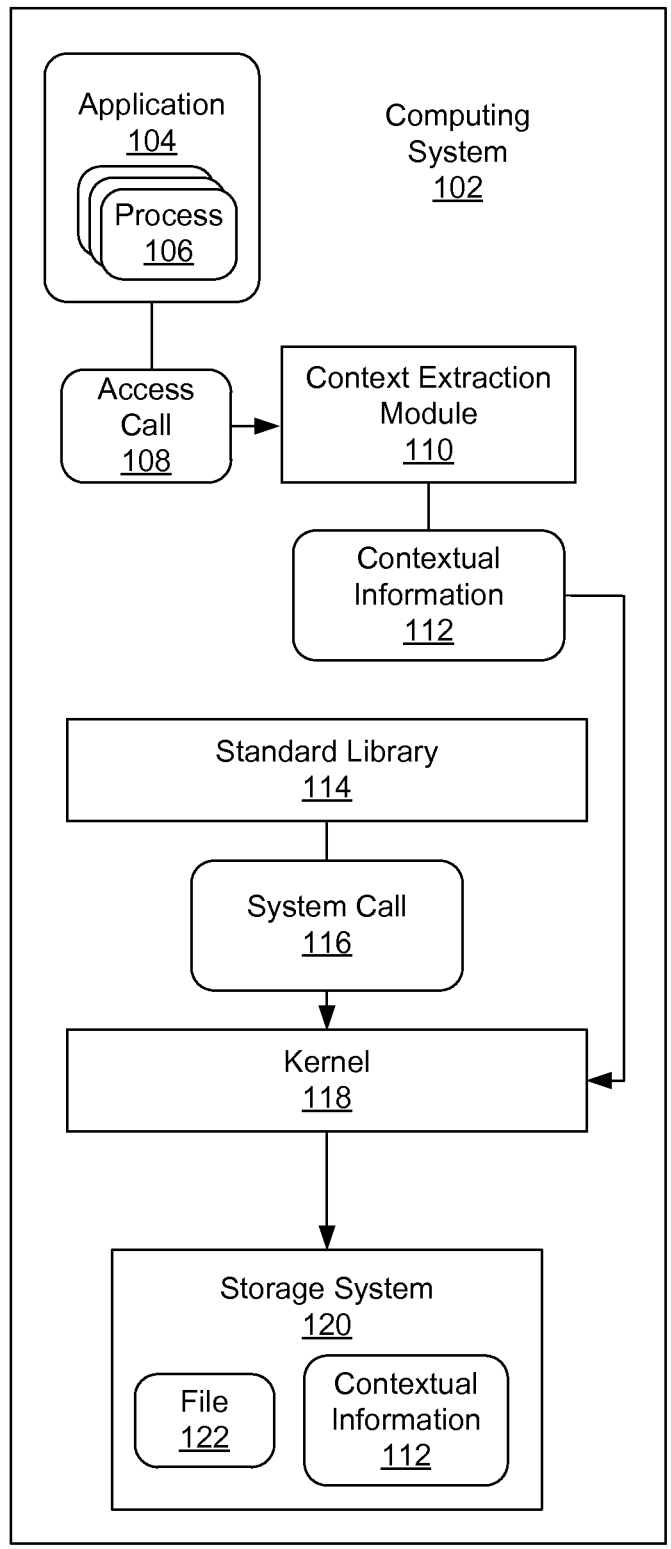
FIG. 1 is a diagram showing components involved in obtaining contextual information related to file accesses in a POSIX-compliant manner, according to one example of principles described herein.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, to help maintain compatibility between computing systems, various standards may be used. One such standard is POSIX standard. POSIX is a family of standards that define APIs for use by an operating system. When an application wishes to access data stored on a storage system, typically in the form of a file, the application will utilize a standard library such as the C standard library (sometimes referred to as libc). A library is a collection of non-volatile resources that are often used to develop applications. A library may include pre-written code, sub-routines, classes, values, or type specifications.

The library may include well-defined sub-routines used to access secure parts of the system. Such sub-routines are invoked through use of a data call. A data call may be a call to access, open, close, read from, write to, or seek through a piece of data such as a file. Because it is good practice to limit the memory space to which an application has access, the application uses the standard library to use a system call to invoke the kernel. The kernel then accesses data on behalf of the application. Currently, storage systems that store data that is accessed in a POSIX-compliant manner (i.e., through use of POSIX APIs) do not obtain and store contextual information about the data being stored on the storage systems. Because it may be useful to maintain such data for various analytical purposes, it is desired to obtain such contextual information for POSIX-compliant systems.

According to methods and systems described herein, contextual information is obtained for POSIX-compliant data calls made to data (e.g., files) stored on a storage system. In one example, a context extraction module intercepts data calls that are made in association with the standard library. Thus, the context extraction module is positioned between the application and the standard library. The context extraction module can obtain various types of contextual information such as the name of the process or application that requested access to the file or the current state of the call stack. This contextual information can then be stored in association with the storage system. For example, the contextual information may be stored as metadata in the storage system itself. In some examples, the contextual information can be stored in a database. In some cases, such a database may be stored on a different storage system than the storage system that stores the files being accessed. The contextual information can then be analyzed for various trends that may be useful to storage administrators, software developers, data forensics analysts, or other entities.

FIG. 1 is a diagram showing components involved in obtaining contextual information related to file accesses in a POSIX-compliant manner. According to the present example, a computing system 102 includes a context extraction module 110, a standard library 114, a kernel 118, and a storage system 120. The computing system 102 includes hardware and software (such as an operating system) capable of supporting an application 104.

The Application 104 may be any type of application 104 that runs on a computing system. In one example, the application 104 is a word processing application. An application 104 may be associated with one or more processes 106. A process is a set of instructions that are being executed. Various processes 106 often access data that is stored in the form of a file 122. Such files 122 are typically stored on a storage system 120.

As described above, to access a file, a process 106 will typically use a data call 108 associated with a standard library 112. But, according to principles described herein, such a data call 108 is intercepted by the context extraction module 110. The context extraction module 110 comprises hardware, software, or a combination of both that obtains contextual information 112 associated with the data call 108.

In one example, the context extraction module 110 is a library linked to the application 104. For example, a library that includes the code to perform functions of the context extraction module 110 can be linked to the application 104 during the linking phase when the executable file for the application 104 is built. In such a case, the executable application includes the code to perform the context extraction module functions. Specifically, when a data call 108 is used to access a file 120, the context extraction module related code will obtain the contextual information 112 associated with the data call 108.

In one example, the context extraction module 110 is a modified standard library. For example, a standard library 114 such as libc can be modified to include the code associated with the context extraction module 110. Thus, when an application 104 uses a data call 108 in accordance with the standard library 114, code within the modified library detects such a data call 108 and obtains the contextual information 112 accordingly.

In one example, the context extraction module 110 is a preloaded linkable library. In such a case, the library is linked to the application 104 at run-time. In some examples, such a preloaded linkable library may be shared by multiple applications. Use of such a preloaded linkable library provides the application with the code to perform the context extraction module functions. Thus, when the application 104 uses a data call 108, the contextual information 112 is obtained accordingly.

Various types of contextual information 112 may be obtained by the context extraction module 110. For example, the name of the process and/or application that used the data call 108 may be obtained. In many cases, various applications and processes may access a single file 122. Thus, it may be useful to have data indicating what applications are accessing the file 122.

In one example, the contextual information 112 includes the state of the call stack when the data call 108 was used. The call stack is a stack data structure that maintains information that directs the processor where to fetch the next instruction after subroutines are finished executing. For example, if a series of instructions are being executed, and an instruction calls a sub-routine for which the instructions are stored elsewhere in memory, the system pushes the return memory address onto the call stack. When the sub-routine finishes executing, the system pops the return address off the stack and then returns to that memory address to continue execution thereat. Thus, the call stack includes information that indicates which sub-routines are invoking the data calls 108.

The contextual information 112 may include various other pieces of information that may be useful. For example, the contextual information 112 may include any arguments that are passed along with the data call. The contextual information 112 may include the date and time at which the data call 108 was made. The contextual information 112 may indicate the type of access such as opening a file, writing to a file, reading from a file, or closing a file. Other forms of contextual information 112 are contemplated.

In addition to the contextual information 112 being obtained by the context extraction module 110, the data call 108 is handled as normal. Specifically, the data call 108 uses a standard library 114 such as the C standard library, which is sometimes referred to as libc. The C standard library is a subset of the POSIX library. Through use of the standard library 114, a system call 116 is used to invoke the kernel 118.

As described above, computing resources are typically carefully controlled for security purposes. Thus, applications generally access such resources through well-defined and trusted routines. Specifically, the kernel 118 will access such resources on behalf of the application. When an application wishes to have the kernel 118 access such resources on its behalf, the application causes a system call 116 is used to invoke the kernel. The system call 116 defines what resources the application seeks. For example, regarding access to data on a storage system, the system call 116 may define whether the application wishes to open, read from, write to, or close a file stored on the storage system 120.

The storage system 120 may be integrated with the computing system 102 or may be a separate device that is in communication with the computing system 102. In one example, the storage system is a non-volatile memory storage system 120 for storing data in the form of files. Specifically, the file 122 for which the data call 108 is made is stored on the storage system 120. In addition, the context extraction module 110 can be configured to store the contextual information 112 on the storage system as metadata for the corresponding file 122. Such a step involves use of the kernel 118 to store data on the storage system.

In some examples, instead of storing the contextual information 112 on the same storage system 120 as the file 122 with which the contextual information 112 is associated, the contextual information 112 may be stored on an external storage device (not shown). For example, the contextual information 112 may be sent to a database. The database may be structured to facilitate various analytical functions that may be applied to the contextual information 112 to determine trends. Such a database will be described in further detail below.

Figure 2:
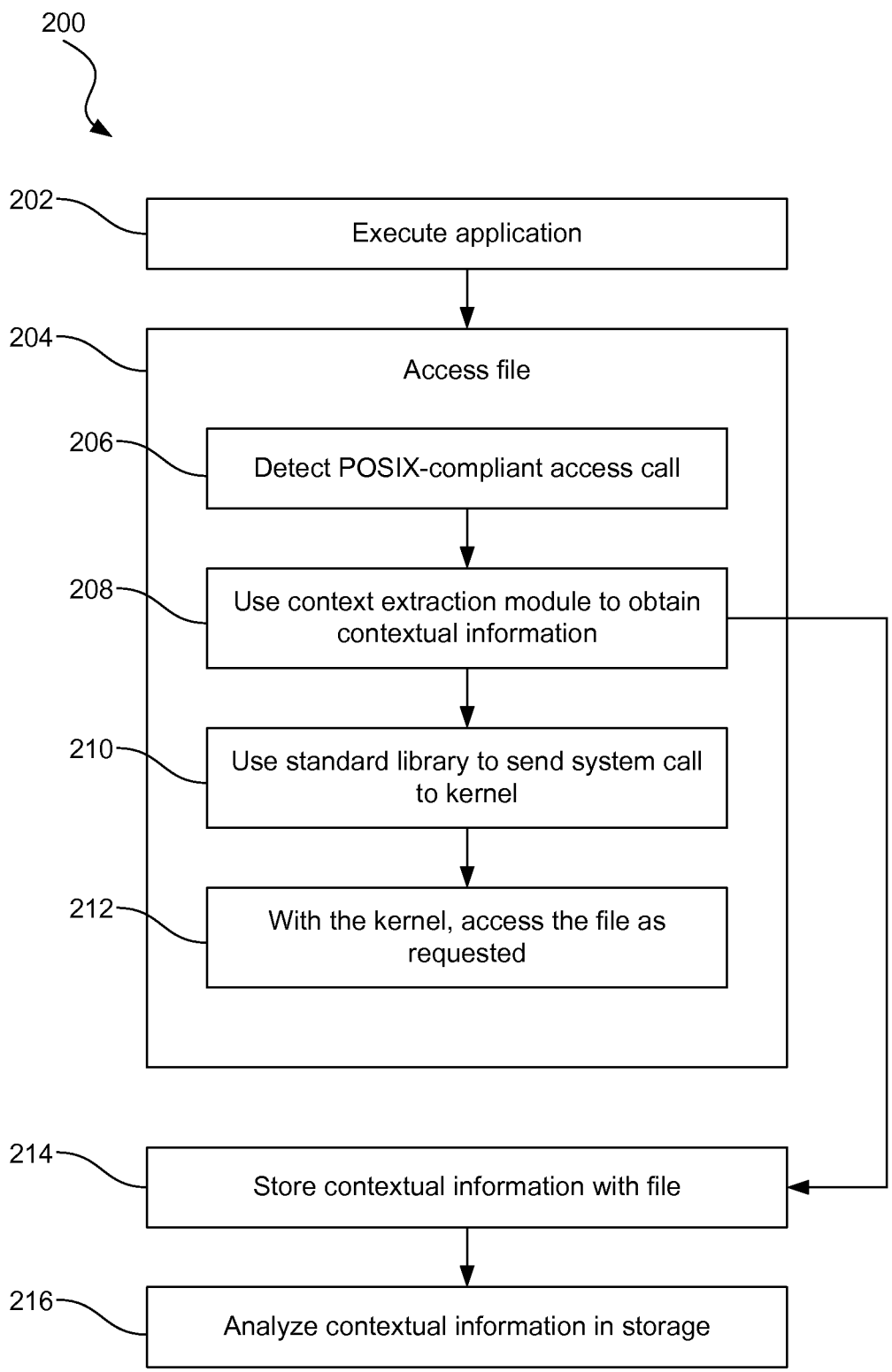
FIG. 2 is a flowchart showing an illustrative method for obtaining contextual information related to file accesses in a POSIX-compliant manner, according to one example of principles described herein.

FIG. 2 is a flowchart showing an illustrative method 200 for obtaining contextual information related to file accesses in a POSIX-compliant manner. According to the present example, the method 200 includes a step 202 for executing an application. The application may be one of a variety of applications. For purposes of discussion, the application in the present example is a word processing application.

The method 200 further includes a step 204 for accessing a file. The application generally accesses the file using a data call. The data call may be one of many types. For example, the data call may be to open a file, write to the file, read from the file, or close the file. Other types of data calls are contemplated as well. Accessing the file includes a number of steps as will be described further below.

At step 206, it is detected that a POSIX-compliant data call has been made. This may be detected in a variety of manners depending on the implementation of the context extraction module as described above. In one example, a library associated with the context extraction module includes code for detecting that a data call has been made.

The method 200 further includes a step for using the context extraction module to obtain contextual information related to the data call. For example, as described above, the contextual information may include the application and/or process that made the data call. The contextual information may also include the current state of the call stack, arguments passed along with the data call, or other information that may be useful to have stored in association with the file.

At step 210, a system call is used to invoke the kernel using the standard library. The system call includes any information that is used by the kernel to access the file on behalf of the application as desired. At step 212, the kernel accesses the file as requested. For example, if the data call is to write a set of data to the file, then the data is written to the file accordingly. If the data call is to read a set of data from the file, then that data is read from the file and returned to the application.

At step 214, the contextual information obtained by the context extraction module is stored in association with the file to which the data call relates. The contextual information may be stored on the same storage device as the file itself. The contextual information may be stored as metadata for the file to which it relates. For example, many storage systems are structured to allow metadata to be stored in association with the files stored thereon. The contextual information can thus be stored with such metadata.

In some examples, however, the contextual information may be stored on a separate storage device. For example, the contextual information may be stored in a database. The database may be formatted to allow for efficient processing of the contextual information as will be described in further detail below.

At step 216, the method includes a step for analyzing the contextual information that has been stored. The contextual information may be analyzed in a variety of manners for a variety of purposes. Generally, the contextual information may be analyzed to determine trends that may be useful for various entities. For example, the contextual information may be analyzed to determine trends related to which applications often access which files. This may be useful for a storage administrator because such files can be relocated within storage for quicker access to such applications. Various other trends may be of use to storage administrators and developers. For example, software developers may be able to analyze the trends to see how their applications access data. Such trends may allow the software developer to determine if there may be better ways to write the application to more efficiently access various files.

Such trends may also be useful for storage administrators. For example, the contextual information may be analyzed to determine which pieces of data are accessed above a threshold number of times by a particular application. A storage administrator may then determine where such files are stored within memory. The storage administrator may then reconfigure the storage system such that the files that are regularly accessed by the particular application are stored near each other. This can allow the computing system to operate more efficiently.

FIG. 3 is a diagram showing an illustrative database 300 of contextual information. According to the present example, the database includes a number of tuples 314. Each tuple 314 has entries for several columns, including an access ID column 302, a file ID column 304, an operation column 306, a process column 308, an arguments column 310, a call stack column 312, a timestamp column 316, and a user ID column 318. The database 300 illustrated in FIG. 3 is merely one example of how data may be structured in accordance with principles described herein. Other data structures and other types of data may be included within a database that represents a collection of contextual information.

The access ID column 302 includes a value that acts as the primary key column and thus uniquely identifies each tuple 314 in the database. The access ID may be either a random or systemic number that is generated by the context extraction module. Other mechanisms for uniquely identifying each data call may be used as well.

The file ID column 304 includes a value that indicates what file has been accessed for the corresponding tuple 302. For example, the file ID may simply be the name of the file or piece of data as it is represented within the storage system. There may be several tuples 302 associated with a single file because files are often accessed multiple times.

The operation column 306 includes a value that indicates what operation is being performed by the corresponding data call. For example, the access operation may be an open operation that opens the file. The access operation may be to write data to a file or otherwise modify the file. The access operation may be to read data from the file. The access operation may also be to close the file. The access operation may be a seek command that searches the file for data that is supplied through an argument.

The process column 308 includes a value that indicates what process initiated the data call. Various processes are typically associated with a particular application. In some cases, multiple processes may be associated with a particular application. Some processes may be associated with an operating system.

The arguments column 310 includes a value that indicates what arguments, if any, were passed along with the data call. When a data call is made, it typically passes parameters that are used by the sub-routine that performs the access function. Such arguments are typically presented as a list of ordered parameters. The values for such parameters may be useful contextual information associated with the data call.

The call stack column 312 includes a copy of the call stack as it existed when the data call was made. As described above, the call stack is used to determine where in memory the processor is to fetch the next instruction after a subroutine finishes processing. The state of the call stack may have useful information for various analytical purposes.

The timestamp column 316 includes a value that indicates the time and date at which the corresponding data call was made. Such information may be useful for analytical purposes. For example, some trends may indicate that data is more often accessed at certain times of the day, certain days of the week, or certain time of year. Storage administrators may wish to use such information to restructure the storage system based on the time of day, day of the week, or time of year.

The user ID column 318 includes a value that indicates the current user identification (ID) that is logged into the computing system that is executing the application making the data call. In some operating systems, a user logs in with a unique identification when using the computing system. A user ID may be associated with various privileges defining what computing resources are accessible by that user. Having the user ID included within the contextual information may be useful for various analytical purposes.

With the contextual information stored in such a format, various functions that use database operations can be applied to the database to find various trends in the data. Such functions may be designed to look for particular trends. For example, a function may be designed to determine the average size of the call stack when a particular file is accessed. Such information may help a developer get a sense for how deep in sub-routines execution of an application is when data calls are being made. Such information may prompt the developer to restructure the application. In another example, a function may be designed to determine the average number of read and write operations made on particular types of files between the time such a file is opened and the time such a file is closed. Various other functions to obtain useful information.

Figure 4:
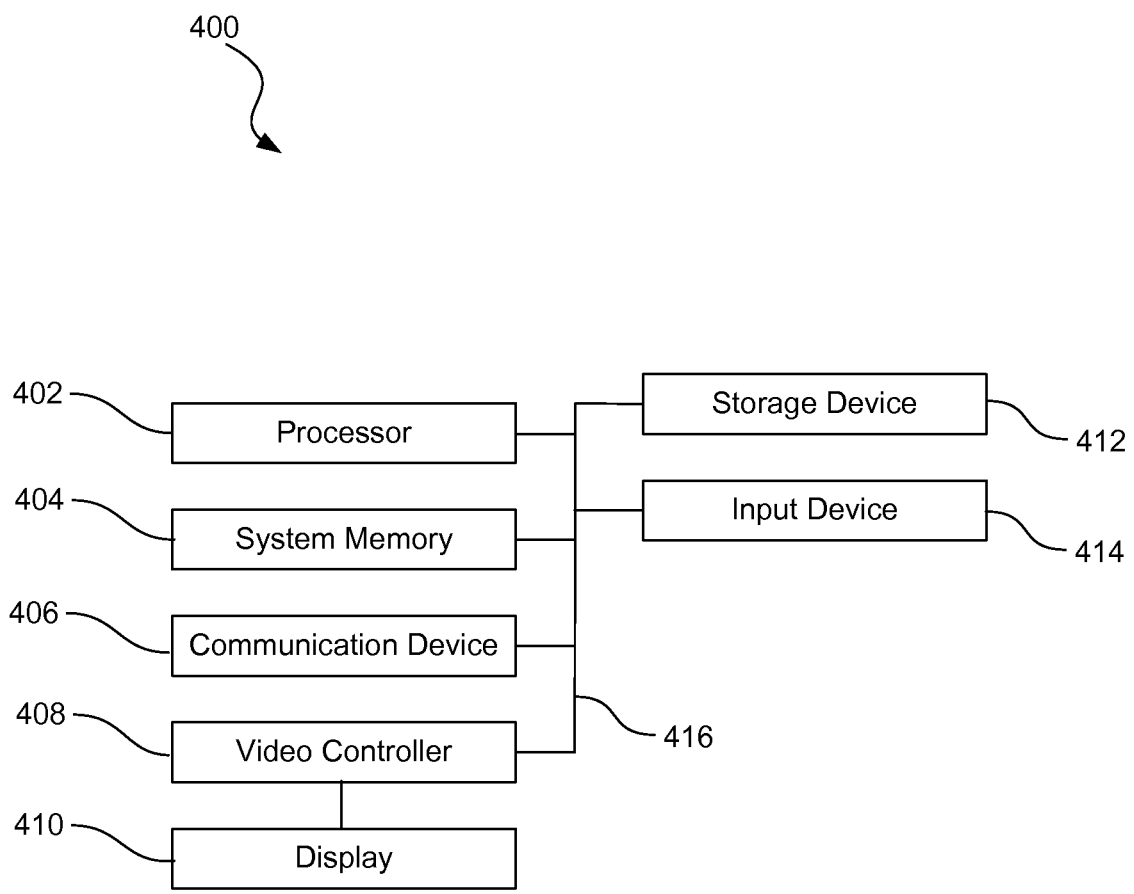
FIG. 4 is a diagram showing an illustrative computing system that may be used to manage contextual information related to, according to one example of principles described herein.

FIG. 4 is a diagram showing an illustrative computing system 400 that may be used to manage contextual information related to data stored on a storage system. In one example, the computing system may be the computing system that runs applications that access various files, thus causing the accumulation of contextual information regarding such accesses. In one example, the computing system 400 may be the system that analyzes the obtained contextual information.

According to the present example, the computing system 400 includes a processor 402, an input device 414, a storage device 412, a video controller 408, a system memory 404, a display 410, and a communication device 406, all of which are interconnected by one or more buses 416.

The storage device 412 may include a computer readable medium that can store data. The storage device 412 may include volatile memory storage devices such as Random Access Memory (RAM) as well as non-volatile memory storage devices such as solid state memory components. The computer readable medium may be a non-transitory tangible media.

In some examples, the communication device 406 may include a modem, network card, or any other device to enable the computing system 400 to communicate with other computing devices. In some examples, any computing device represents a plurality of interconnected (whether by intranet or Internet) computer systems, including without limitation, personal computers, mainframes, PDAs, smartphones and cell phones.

A computing system such as the computing system 400 typically includes at least hardware capable of executing machine readable instructions, as well as the software for executing acts (typically machine-readable instructions) that produce a desired result. In some examples, a computing system may include hybrids of hardware and software, as well as computer sub-systems.

In some examples, hardware generally includes at least processor-capable platforms, such as hand-held processing devices (such as smart phones, tablet computers, personal digital assistants (PDAs), or personal computing devices (PCDs), for example. In some examples, hardware may include any physical device that is capable of storing machine-readable instructions, such as memory or other data storage devices. In some examples, other forms of hardware include hardware sub-systems, including transfer devices such as modems, modem cards, ports, and port cards, for example.

In some examples, software includes any machine code stored in any memory medium, such as RAM or ROM, and machine code stored on other devices (such as floppy disks, flash memory, or a CD ROM, for example). In some examples, software may include source or object code. In several exemplary embodiments, software encompasses any set of instructions capable of being executed on a computing device such as, for example, on a client machine or server.

In some examples, combinations of software and hardware could also be used for providing enhanced functionality and performance for certain embodiments of the present disclosure. In some examples, software functions may be directly manufactured into an integrated circuit. Accordingly, it should be understood that combinations of hardware and software are also included within the definition of a computer system and are thus envisioned by the present disclosure as possible equivalent structures and equivalent methods.

In some examples, computer readable mediums include, for example, passive data storage, such as a random access memory (RAM) as well as semi-permanent data storage such as a solid state drive. One or more exemplary embodiments of the present disclosure may be embodied in the RAM of a computing device to transform a standard computer into a new specific computing machine. In some examples, data structures are defined organizations of data that may enable an embodiment of the present disclosure. In an exemplary embodiment, a data structure may provide an organization of data, or an organization of executable code.

In some examples, a network and/or one or more portions thereof may be designed to work on any specific architecture. In some examples, one or more portions of the network may be executed on a single computer, local area networks, client-server networks, wide area networks, internets, handheld and other portable and wireless devices and networks.

In some examples, a database may be any standard or proprietary database software, such as Oracle, Microsoft Access, SyBase, or DBase II, for example. The database may have fields, records, data, and other database elements that may be associated through database specific software. In several exemplary embodiments, data may be mapped. In some examples, mapping is the process of associating one data entry with another data entry. In an exemplary embodiment, the data contained in the location of a character file can be mapped to a field in a second table. In some examples, the physical location of the database is not limiting, and the database may be distributed. In some examples, the database may exist remotely from the server, and run on a separate platform. In some examples, the database may be accessible across the Internet. In several exemplary embodiments, more than one database may be implemented.

In some examples, a computer program, such as a plurality of instructions stored on a computer readable medium, such as the computer readable medium, the system memory 404, and/or any combination thereof, may be executed by a processor 402 to cause the processor 402 to carry out or implement in whole or in part the operation of the computing system 400, one or more of the methods. In some examples, such a processor 402 may execute the plurality of instructions in connection with a virtual computer system.

Some examples of processing systems described herein may include non-transitory, tangible, machine readable media that include executable code that when run by one or more processors (e.g., processor 402) may cause the one or more processors to perform the processes of methods as described above. Some common forms of machine readable media that may include the processes of methods for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method performed by a computing system, the method comprising:
   detecting a data call from an application running on the system, the data call being to access data through a Portable Operating System Interface (POSIX) Application Programming Interface (API), the data being stored on a storage system associated with the computing system;
   in response to detecting the data call, obtaining, through use of a context extraction module, contextual information associated with the data call, wherein the contextual information includes a copy of a call stack as the call stack existed when the data call was made;
   accessing the data according to the data call;
   storing the contextual information in association with a file to which the data call relates; and
   performing an analysis on the stored contextual information to detect trends, the analysis including determining an average size of the call stack when the data was accessed.

2. The method of claim 1, wherein the context extraction module comprises a library that is directly linked to the application.

3. The method of claim 1, wherein the context extraction module comprises a modified standard library.

4. The method of claim 1, wherein the context extraction module comprises a preloaded linkable library.

5. The method of claim 1, wherein the process is associated with the application.

6. The method of claim 1, wherein the contextual information comprises arguments associated with the call.

7. The method of claim 1, wherein the contextual information comprises at least one of: information within a current call stack, time and date information, and a user identification.

8. The method of claim 1, wherein storing the contextual information comprises saving the contextual information as metadata on the storage system.

9. The method of claim 1, wherein storing the contextual information comprises saving the contextual information in a database.

10. The method of claim 1, further comprising, determine locations of data accessed by a particular application above a threshold number of times.

11. The method of claim 1, further comprising, reconfiguring the storage system such that the data accessed by the particular application above the threshold number of times are co-located.

12. A system comprising:
    a processor; and
    a memory comprising machine readable instructions that when executed by the processor, cause the system to:
    execute an application;
    detect a data call from the application, the data call requesting access to data through a Portable Operating System Interface (POSIX) Application Programming Interface (API), the data being stored on a storage system associated with the system;
    in response to detecting the data call, determine, through use of a context extraction module, contextual information associated with the data call, wherein the contextual information includes a copy of a call stack as the call stack existed when the data call was made;
    store the contextual information in association with a file to which the data call relates; and
    perform an analysis on the stored contextual information to detect trends, the analysis including determining an average size of the call stack when the data was accessed.

13. The system of claim 12, wherein the context extraction module comprises one of: a library that is directly linked to the application, a modified standard library, or a preloaded linkable library.

14. The system of claim 12, wherein the contextual information comprises at least one of: a name of a process that uses the call, the process being associated with the application, arguments associated with the call, and information within a current call stack.

15. The system of claim 12, wherein to store the contextual information, the system is further configured to save the contextual information as metadata on the storage system.

16. The system of claim 12, wherein to store the contextual information, the system is further configured to save the contextual information in a database.

17. A method performed by a computing system, the method comprising:
    executing an application;
    with the application, using a data call to a Portable Operating System Interface (POSIX) Application Programming Interface (API), the data call requesting access to a file stored on a storage system associated with the computing system;
    with a context extraction module, determining contextual information associated with the call, wherein the contextual information includes a copy of a call stack as the call stack existed when the data call was made;

through use of a library, causing the kernel to access the file according to the data call;

storing the contextual information on the storage system; and performing an analysis on the contextual information to detect trends, the analysis including determining an average size of the call stack when the data was accessed.

18. The method of claim 1, further comprising:

detecting an additional data call to access the file; and updating the contextual information on the storage system based on additional contextual information associated with the additional data call.

19. The method of claim 1, wherein the data call comprises a request to perform at least one of the following types of operations on the file: open, read, write, seek and close.

\* \* \* \* \*